No. 839,446. PATENTED DEC. 25, 1906.
L. ANDERSON.
PISTON CONNECTION FOR PISTON RODS.
APPLICATION FILED SEPT. 20, 1906.
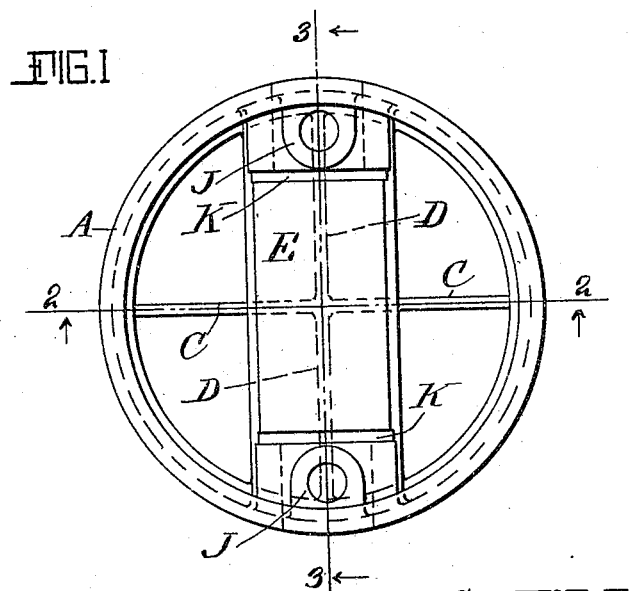
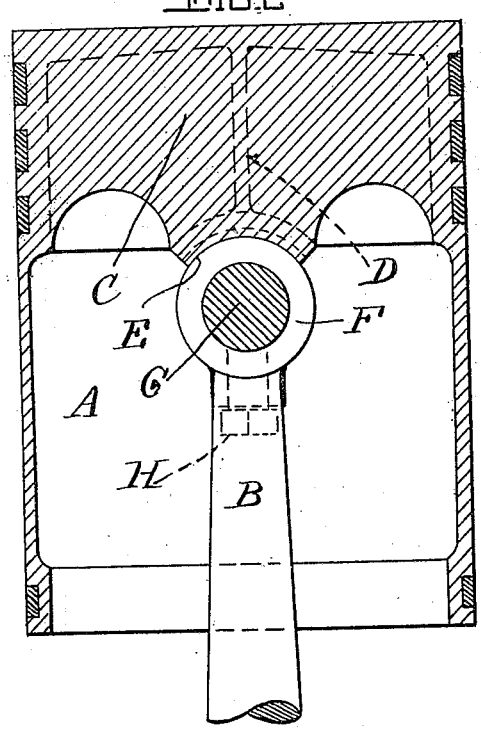
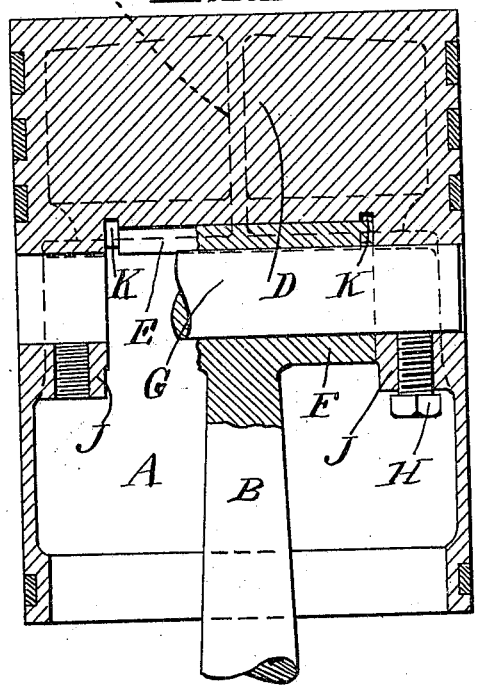
Witnesses
J. F. Higgins
A. Thira
Inventor
Lars Anderson
By his Attorneys
Brown, Darby & Hopkins

UNITED STATES PATENT OFFICE.

LARS ANDERSON, OF NEW YORK, N. Y., ASSIGNOR TO TRIPLEX GAS ENGINE COMPANY, OF NEW YORK, N. Y., A CORPORATION OF NEW JERSEY.

PISTON CONNECTION FOR PISTON-RODS.

No. 839,446.   Specification of Letters Patent.   Patented Dec. 25, 1906.

Application filed September 20, 1906. Serial No. 335,364.

*To all whom it may concern:*

Be it known that I, LARS ANDERSON, a citizen of the United States, and a resident of New York, in the county of New York, State of New York, have made a certain new and useful Invention in Piston Connections for Piston-Rods, of which the following is a specification.

The invention relates to piston connections for piston-rods.

The object of the invention is to provide a piston connection for piston-rods which is simple in construction and efficient in operation and wherein provision is made for ample bearing-surface between the parts to receive the thrust of the piston, while permitting the oscillating movements of the piston-rod.

The invention consists, substantially, in the construction, combination, location, and relative arrangement of parts, all as will be more fully hereinafter set forth, as shown in the accompanying drawings, and finally pointed out in the appended claims.

Referring to the accompanying drawings, and to the various views and reference-signs appearing thereon, Figure 1 is an end view of a piston constructed in accordance with the principles of my invention, the piston-rod being removed. Fig. 2 is a broken view in section on the line 2 2, Fig. 1, looking in the direction of the arrows and showing the connection of the piston-rod to the piston. Fig. 3 is a view similar to Fig. 2 on the line 3 3, Fig. 1, looking in the direction of the arrows, parts broken out.

The same part is designated by the same reference-sign wherever it occurs in the several views.

In connecting piston-rods to pistons it is exceedingly desirable to provide efficient bearing and wearing surfaces for the piston and rod, whereby the rod is permitted oscillating movement, while at the same time it is enabled to efficiently resist the thrust imposed thereon in the operation of the engine. In the accomplishment of these ends I provide the piston with an efficiently-braced bearing seat or surface to receive the end of the piston-rod, and in addition I provide the piston-rod with a pivot-pin or stud for securing the same pivotally to the piston and which also affords an efficient bearing for the rod.

In the drawings, A is the piston, which in this instance is of open-ended type, and B is the piston-rod. The piston A is provided or formed with webs or ribs C D on the interior side of the closed end thereof and which, as shown, and preferably extend at right angles to each other, although in this respect I do not desire to be limited or restricted. Upon the edges of these ribs or webs which are presented toward the open end of the cylinder is formed a segmental bearing-seat E of a contour adapted to conform to and to receive the exterior cylindrical surface of a transversely-extending sleeve or head F, with which the end of the piston-rod is provided, the seat E forming a bearing in which the head or sleeve F may rock during the oscillating movements of the piston-rod. The end of the piston-rod is pivotally secured in place by means of a pin or stud G, passing transversely through the piston and extending through the bore of head or sleeve F.

The pin or stud may be rigidly secured in place in any suitable or convenient manner—as, for instance, by means of set-screws H, tapped through bosses or lugs J, formed on or secured to the piston, as shown. I do not desire, however, to be limited or restricted to this particular means for fastening or securing the stud or pin in place.

From the foregoing description it will be seen that the piston head or end which receives the impact of the motive power is strengthened by the provision of the ribs or webs on the interior surface thereof. It will also be seen that by forming the bearing-seat for the end of the piston-rod in the edges of the webs or ribs such seat is exceedingly strong and durable and affords a most efficient bearing for the end of the piston-rod, enabling it to efficiently withstand the thrust imposed thereon in the operation of the engine. It will also be seen that the thrust strain upon the piston-rod is distributed between the bearing-seat therefor and the pivot-pin for connecting the rod to the piston, said pin also affording an efficient bearing for the piston-rod. Thus the piston-rod has a double bearing, the one afforded by the bearing-seat and one afforded by the pin or stud.

I prefer to make the bearing-seat E of shorter length than the length of the head or sleeve C, thereby leaving the pockets or recesses K at the ends of the bearing-seat and reducing the friction of the bearing-surfaces without hindering the efficiency of the bearing.

The connection or disconnection of the piston-rod to the piston can be quickly and easily effected by merely inserting and securing or withdrawing the pin G.

Having now set forth the object and nature of my invention and a construction embodying the principles thereof, what I claim as new and useful and of my own invention, and desire to secure by Letters Patent, is—

1. The combination with a piston having a bearing-seat on the inner face of the working end thereof, of a piston-rod having a head or sleeve adapted to be received into said seat, and means extending longitudinally through the head or sleeve for pivotally connecting said head or sleeve to the piston.

2. The combination with a piston having webs or ribs formed on the inner face of the working end thereof, and a bearing-seat formed in the edges of said ribs or webs, of a piston-rod having a head adapted to be received in said seat, and means extending longitudinally through the head or sleeve for pivotally securing said head in place.

3. The combination of a piston having a bearing-seat on the inner side of the working end thereof, a piston-rod having a head or sleeve adapted to be received in said bearing-seat, and a pivot-pin passing transversely through the piston and extending longitudinally through said head or sleeve to pivotally secure the same in bearing relation with respect to said seat.

4. The combination of a piston having a closed end and ribs or webs on the inner face of said closed end, a bearing-seat formed in the edges of said ribs or webs which are presented toward the opposite end of the piston, a piston-rod having a head adapted to be received in and bear against said seat, and a pivot-pin passing transversely through the piston and extending longitudinally through said head, to pivotally retain the same in bearing relation with respect to said seat.

5. The combination of a piston closed at one end and open at the other, and provided with strengthening ribs or webs on the inner face of the closed end thereof, said ribs or webs having a bearing-seat formed on the edges thereof which are presented toward the open end of the piston, a piston-rod extending into the open end of the piston and provided with a cylindrical bearing-sleeve at the end thereof, said sleeve adapted to be received in and bear against said seat, a pin passing transversely through the piston and extending longitudinally through said sleeve to pivotally secure the same in said seat, and means for removably securing the pin in place.

6. The combination of a piston having a segmental bearing-seat, a piston-rod having a bearing-sleeve adapted to have bearing in said seat but of greater length than said seat, and a pin extending longitudinally through said sleeve and having its ends extending through the walls of the piston for pivotally securing said sleeve in said seat.

In testimony whereof I have signed my name to this specification, in the presence of two subscribing witnesses, on this 19th day of September, A. D. 1906.

LARS ANDERSON.

Witnesses:
J. F. HIGGINS,
S. E. DARBY.